United States Patent
Hall et al.

(10) Patent No.: US 6,414,962 B1
(45) Date of Patent: Jul. 2, 2002

(54) METHOD AND APPARATUS FOR CACHING LOCATION INFORMATION OF TRANSMITTING MOBILE STATIONS

(75) Inventors: Göran Hall, Mölndal; Hans-Göran Sundell, Göteborg; Stefan Toth, Göteborg; Mats Lindén, Göteborg; Jan Lindskog, Mölnlycke, all of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/033,942

(22) Filed: Mar. 2, 1998

(51) Int. Cl.[7] .................................................. H04J 3/24
(52) U.S. Cl. ..................................................... 370/401
(58) Field of Search ................................. 370/463, 312, 370/332, 313, 335, 389, 392, 393, 400, 401, 216, 218, 465, 403, 351, 352; 455/435, 443, 466, 410, 432, 552, 502, 509, 513, 517, 524, 525, 422, 428, 433, 434, 436–439, 455, 450, 456, 457; 709/253; 342/452

(56) References Cited

U.S. PATENT DOCUMENTS

| | | | |
|---|---|---|---|
| 5,410,543 A | | 4/1995 | Seitz et al. ................. 370/463 |
| 5,457,680 A | | 10/1995 | Kamm et al. .............. 370/332 |
| 5,490,139 A | | 2/1996 | Baker et al. ............... 370/312 |
| 5,490,203 A | | 2/1996 | Jain et al. ................... 455/435 |
| 5,577,168 A | | 11/1996 | Haas et al. ................. 455/433 |
| 5,708,655 A | * | 1/1998 | Toth et al. .................. 370/313 |
| 5,793,762 A | * | 8/1998 | Penners et al. ............ 370/389 |
| 5,933,784 A | * | 8/1999 | Gallagher et al. .......... 455/552 |
| 5,978,685 A | * | 11/1999 | Laiho ......................... 455/466 |
| 5,991,306 A | * | 11/1999 | Burns et al. ................ 370/400 |
| 6,055,434 A | * | 4/2000 | Sezaj .......................... 455/456 |
| 6,061,572 A | * | 5/2000 | Laiho ......................... 455/466 |

FOREIGN PATENT DOCUMENTS

| | | | | |
|---|---|---|---|---|
| EP | 0750437 | * | 12/1996 | ............ H04Q/7/24 |
| WO | WO 95/28063 | * | 10/1995 | |
| WO | WO 98/32299 | | 7/1998 | |

OTHER PUBLICATIONS

PCT International Search Report, Sep. 27, 1999, PCT/SE99/00280.

* cited by examiner

*Primary Examiner*—Dang Ton
(74) *Attorney, Agent, or Firm*—Jenkens & Gilchrist

(57) ABSTRACT

A method and apparatus for caching mobile station location information comprising a gateway packet switch node for receiving and transmitting data packets between a plurality of visiting packet switch nodes and at least one communication network and a cache memory located within the gateway packet switch node for caching location information received with a data packet from a transmitting mobile station. A communication packet, containing information pertaining to the location of a transmitting mobile station is received by the gateway packet switch node. The location information is extracted from the received communication packet and cached. When an incoming data packet is received by the gateway packet switch node, a determination is made as to whether the location information for the destination mobile station is stored within the cache. If the location information is stored within the cache the location information is retrieved from the cache and the data packet is routed to the mobile station. Otherwise, the location information is retrieved from a home location register and the data packet is routed to the mobile station.

6 Claims, 3 Drawing Sheets

METHOD AND APPARATUS FOR CACHING LOCATION INFORMATION OF TRANSMITTING MOBILE STATIONS

BACKGROUND OF THE INVENTION

1. Technical Field of the Invention

The present invention pertains in general to a method and apparatus for storing mobile station location information in a mobile radio network and, more particularly, but not by way of limitation, to a method and apparatus for caching location information of transmitting mobile stations in a gateway packet switch node.

2. Description of the Related Art

In a mobile radio network, a geographical service area is divided into a plurality of cells. Communication services are provided to mobile stations moving between the cells by a plurality of base stations. The base stations are grouped together in a plurality of Mobile Services Switching Centers (MSCs) which effectuates communication between the individual base stations and the mobile radio network. Communication with other networks outside of the mobile radio network is effectuated via a Gateway Mobile Services Switching Center (GMSC). In a mobile radio network which provides packet data services, the Mobile Services Switching Centers are referred to as Visiting Packet Switch Nodes (Visiting PSNs) and the Gateway Mobile Services Switching Center is referred to as a Gateway Packet Switch Node (Gateway PSN).

When a mobile station in a mobile radio network receives a voice call, whether it be from a party outside the mobile radio network or from a subscriber to the mobile radio network, the call is routed to the GMSC. The GMSC "looks up" location information for that called party contained in a Home Location Register (HLR) to determine the current location of the mobile station. The HLR stores the current location information of the mobile station. The location information is updated by the Visiting PSN every time the mobile station performs a registration with the Visiting PSN. Using this information, the GMSC routes the call to the appropriate servicing MSC which further routes the call to the base station currently serving the mobile station thereby establishing a call between the party calling the mobile station and the mobile station being called.

Packet data services are being introduced at an increasing rate into mobile radio networks. Packet data services provide an efficient connection between digital terminal equipment connected to mobile stations in a mobile radio network and other digital terminal equipment both internal and external to the mobile radio network. Using a packet data service, data is transmitted as discrete data packets. When a data packet is transmitted from digital terminal equipment connected to a mobile station, each packet sent by the digital terminal equipment includes the address of the destination digital terminal equipment. Likewise, when the Gateway PSN receives incoming data packets for the digital terminal equipment connected to the mobile station, the logical address of the mobile station is included with each received data packet.

Establishing the voice call requires that the GMSC access the HLR once to determine the location of the mobile station being called; however, in a mobile radio network which provides packet data services, the number of accesses which the Gateway PSN makes to the HLR is greatly increased. In order for the Gateway PSN to route the data packet to the mobile station, the Gateway PSN accesses the HLR to determine the physical location of the mobile station. Because every data packet sent to the mobile station is sent autonomously, the Gateway PSN must access the HLR to determine location information for each data packet which greatly increases the communication between the Gateway PSN and the HLR as compared to voice calls.

To reduce the number of accesses which the Gateway PSN makes to the HLR, it has been proposed to cache the location information contained within the HLR in a cache located within the Gateway PSN. Although this approach reduces the number of accesses the Gateway PSN makes to the HLR it has certain drawbacks. The proposed cache needs to be large enough to hold the location of all the mobile stations operating within the mobile radio network. Otherwise, when a first packet for a mobile station, not included in the cache, is received by the Gateway PSN, the Gateway PSN must access the HLR to retrieve location information for the mobile station. Furthermore, whenever a mobile station moves between base stations the location information is updated in the HLR thereby requiring the cache to be updated. Maintaining the cache thus becomes overhead for the Gateway PSN.

It would be advantageous to devise a method and apparatus to cache mobile station location information in a Gateway PSN which reduces the number of accesses the Gateway PSN needs to make to the HLR. It would further be advantageous if such a method and apparatus did not store the location of all the mobile stations operating within the mobile radio network but instead, anticipated the mobile station location information which is most likely to be needed.

SUMMARY OF THE INVENTION

The present invention comprises a method and apparatus for caching mobile station location information including a gateway packet switch node for receiving and transmitting data packets between a plurality of visiting packet switch nodes within a mobile radio network and at least one communication network and a cache memory located within the gateway packet switch for caching location information received with a data packet from a transmitting mobile station.

A communication packet, containing information pertaining to the location of a transmitting mobile station is received by the gateway packet switch node. The location information is extracted from the received communication packet and stored in a cache.

When a data packet addressed to a mobile station is received by the gateway packet switch node, a determination is made as to whether the location information pertaining to the mobile station is stored within the cache. If the location information is stored within the cache the location information is retrieved from the cache and the data packet is routed to the mobile station. Otherwise, the location information is retrieved from a home location register and the data packet is routed to the mobile station.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE PREFERRED EXAMPLARY EMBODIMENTS OF THE INVENTION

Figure 1:
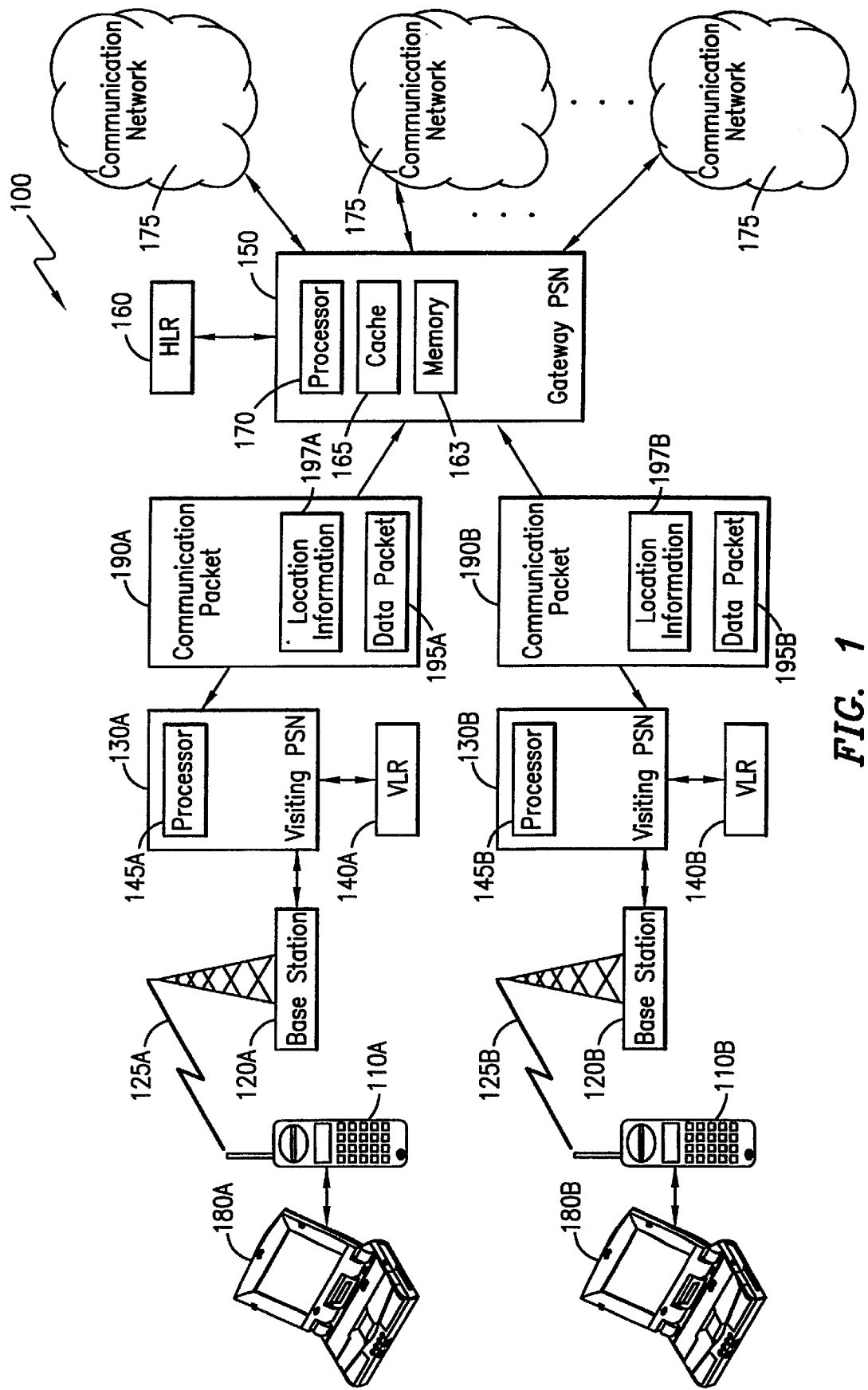
FIG. 1 is a functional block diagram of an apparatus for caching mobile station location information in a mobile radio network.

Referring now to FIG. 1, there is illustrated a functional block diagram of an apparatus for caching mobile station location information in a mobile radio network. A mobile radio network, shown generally at 100, comprises a plurality of mobile stations 110 including a first mobile station 110A and a second mobile station 110B communicating with a plurality of base stations 120 across an air interface 125. In FIG. 1, the first mobile station 110A communicates with a first base station 120A across a first air interface 125A and the second mobile station 110B communicates with a second base station 120B across a second air interface 125B.

The plurality of base stations 120 are selectively divided into groups of base stations which interface with the mobile radio network 100 via a plurality of Visiting Packet Switch Nodes (Visiting PSNs) 130. In FIG. 1, the first base station 120A interfaces with the mobile radio network 100 via a first Visiting PSN 130A and the second base station 120B interfaces with the mobile radio network 100 via a second Visiting PSN 130B.

Each of the Visiting PSNs 130 include a Visiting PSN processor 145 having access to an associated Visitor Location Register (VLR) 140. The Visitor Location Registers 140 store information pertaining to the location of mobile stations 110 operating within that portion of the mobile radio network served by the base stations 120 associated with the particular Visiting PSN 130. For example, in FIG. 1, the first Visiting PSN 130A includes a Visiting PSN processor 145A which accesses a first Visiting Location Register 140A to determine the location of mobile stations 110, including mobile station 110A, which are served by the base stations 120, including base station 120A, connected to the first Visiting PSN 130A. Likewise, the second Visiting PSN 130B includes a Visiting PSN processor 145B which accesses a second Visiting Location Register 140B to determine the location of mobile stations 110, including mobile station 110B, which are served by the base stations 120, including base station 120B, connected to the second Visiting PSN 130B.

Each of the Visiting PSNs 130 communicates with a Gateway Packet Switch Node (Gateway PSN) 150 in order to communicate with other Visiting PSNs 130 and external communication networks 175. The Gateway PSN 150 accesses a Home Location Register (HLR) 160 which contains the location of mobile stations 110 which are currently operating within the mobile radio network 100. The Gateway PSN 150 includes a cache 165 for caching location information pertaining to the location of mobile stations 110 which have transmitted a data packet across the mobile radio network 100, and a memory 163 for storing incoming data packets.

When a digital terminal equipment 180 connected to a mobile station 110, for example digital terminal equipment 180A connected to the mobile station 110A, sends a data packet 195A across the mobile radio network 100, the data packet 195A transmitted across the air interface 125A to the base station 120A and then forwarded to the Visiting PSN 130A. In a first embodiment of the present invention, the base station 120A forwards location information 197A pertaining to the location of the mobile station 110A along with the data packet 195A.

In a second embodiment of the present invention, the Visiting PSN 130A accesses the Visiting Location Register 140A to retrieve location information 197A pertaining to the location of the mobile station 110A stored in the Visiting Location Register 140A. In a third embodiment of the present invention, the location information 197A comprises the identity of the Visiting PSN 130A associated with the base station 120A serving the mobile station 110A. In any event, the Visiting PSN processor 145A encapsulates the data packet 195A together with the location information 197A to form a communication packet 190A and the Visiting PSN 130A forwards the communication packet 190A to the Gateway PSN 150.

Upon receiving the communication packet 190A, a Gateway PSN processor 170, located within the Gateway PSN 150, de-encapsulates the communication packet 190A to access the location information 197A. If the location information 197A does not already exist in the cache 165 or if the location information stored in the cache differs from the newly received location information 197A, the Gateway PSN processor 170 updates and stores the location information 197A in the cache 165 and the Gateway PSN 150 transmits the data packet, using the appropriate communication protocol, to data terminal equipment connected to either one of the external communication networks 175 or to the mobile radio network 100, for example digital terminal equipment 180B connected to mobile station 110B.

Figure 2:
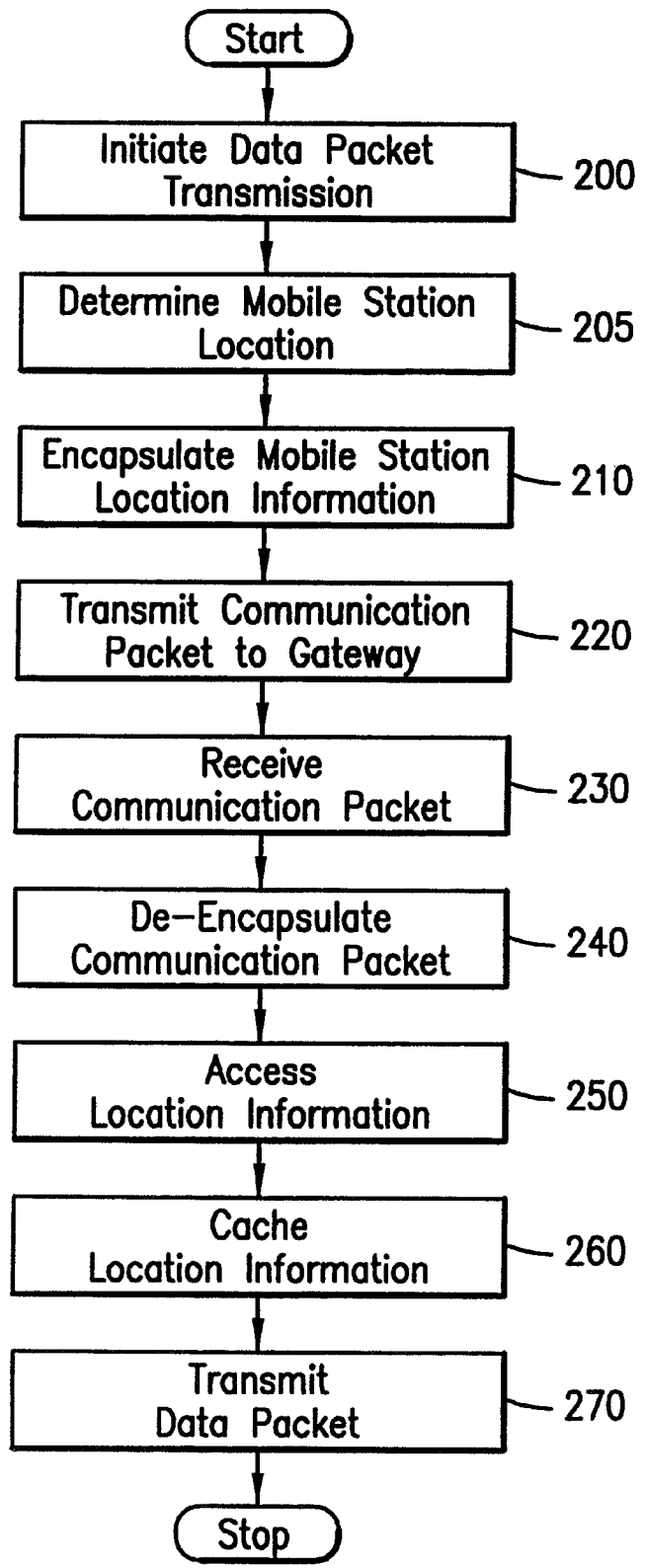
FIG. 2 is a flow diagram of a method for caching mobile station location information in a mobile radio network consistent with the embodiments described in FIG. 1.

Referring additionally now to FIG. 2, there is illustrated a flow diagram of a method for caching mobile station location information in a mobile radio network consistent with the embodiments described in FIG. 1. When the digital terminal equipment 180A sends the data packet 195A to a destination digital terminal equipment, the first mobile station 110A initiates a data packet transmission (step 200). The destination digital terminal equipment can either be connected to an external communication network 175 or the destination digital terminal equipment can be connected to a mobile station 110 operating within the mobile radio network 100, for example the second digital terminal equipment 180B connected to the second mobile station 110B.

In initiating the data packet transmission in step 200 of FIG. 2, the first mobile station 110A establishes communication with the first base station 120A and transmits the data packet 195A to the first base station 120A via the first air interface 125A. The first base station 120A routes the data packet 195A to the first Visiting PSN 130A. Upon receiving the data packet 195A, the Visiting PSN processor 145A determines the location of the first mobile station 110A (step 205). In a first embodiment of the present invention, the first base station 120A forwards location information 197A pertaining to the location of the first mobile station 110A together with the data packet 195A. In a second embodiment of the present invention, the Visiting PSN processor 145A accesses the first Visiting Location Register 140A to determine the location of the first mobile station 110A. In a third embodiment of the present invention, the location information 197A comprises the identity of the Visiting PSN 130A associated with the base station 120A serving the mobile station 110A.

In any event, the Visiting PSN processor 145A encapsulates the location information 197A together with the data packet 195A to form the first communication packet 190A (step 210). The first Visiting Packet Switch Node 130A transmits the communication packet 190A to the Gateway PSN 150 (step 220) and the Gateway PSN 150 receives the communication packet 190A (step 230). The Gateway PSN processor 170 de-encapsulates the communication packet 190A (step 240) and accesses the location information 197A located within the communication packet 190A (step 250). The Gateway PSN processor 170 caches the location information 197A in the cache 165 (step 260). The Gateway PSN 150, using the appropriate communication protocol, transmits the data packet 195A across one of the communication networks 175 or back across the mobile radio network 100 to the second digital terminal equipment 180B connected to the second mobile station 110B (step 270).

Figure 3:
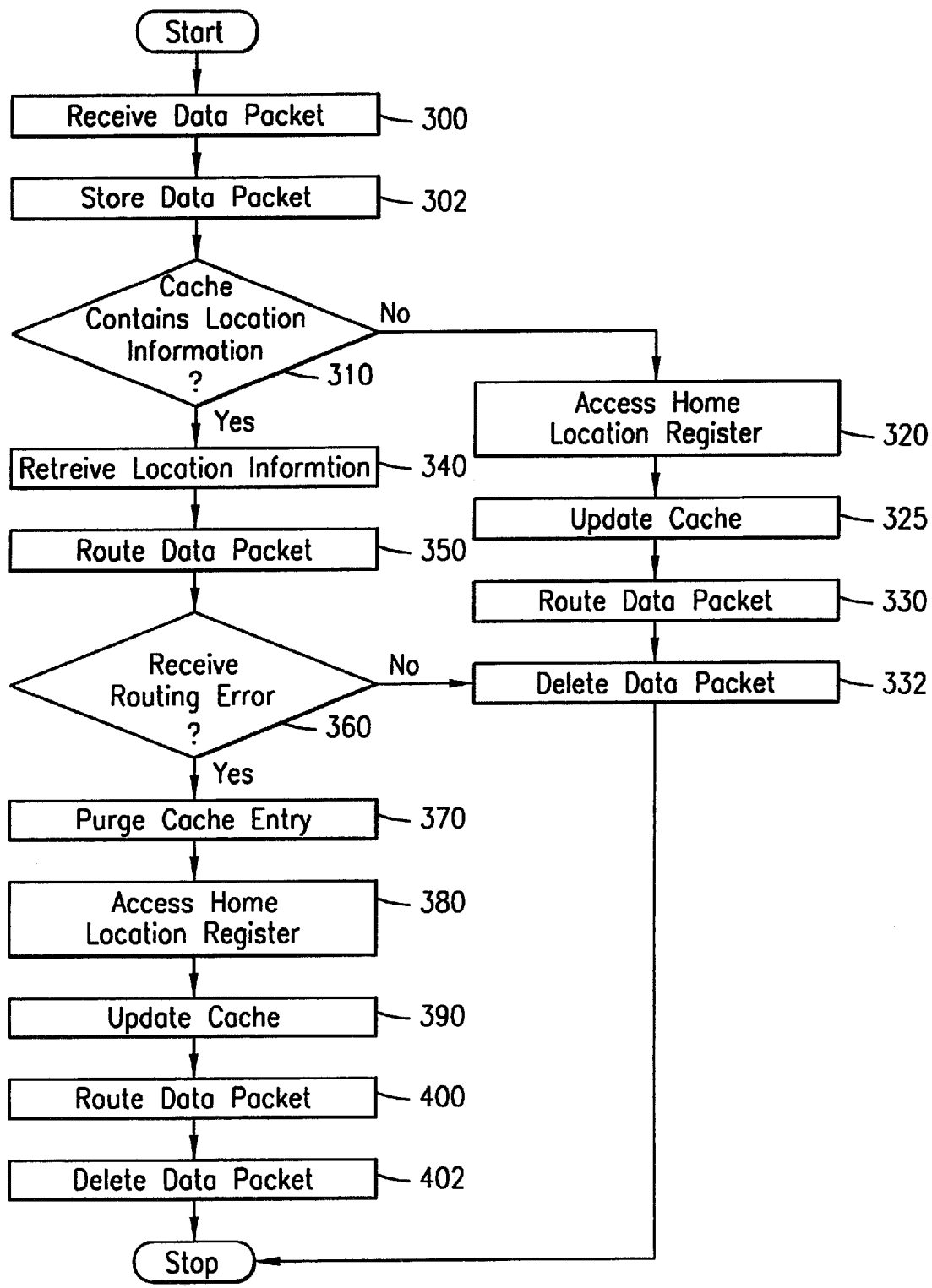
FIG. 3 is a flow diagram of a method for purging and updating entries in the cache consistent with the embodiments described in FIG. 1.

Referring additionally now to FIG. 3, there is illustrated a flow diagram of a method for purging and updating entries in the cache 165 consistent with the embodiments described in FIG. 1. The Gateway PSN 150 receives a data packet addressed to a destination digital terminal equipment 180 connected to a destination mobile station 110 operating within the mobile radio network 100, for example, digital terminal equipment 180A connected to the mobile station 110A (step 300) and stores the data packet in the memory 163 (step 302) in case a routing error is encountered. Alternatively, instead of storing the data packet in step 302, the data packet can be piggybacked on a routing error message in which case it can be present with an updated location information or the data packet can simply be lost. The data packet can originate either from a digital terminal equipment connected to an external communication network 175 or from a digital terminal equipment 180 connected to a mobile station 110 operating within the mobile radio network 100, for example, digital terminal equipment 180B connected to mobile station 110B. A determination is made as to whether the cache 165 contains information pertaining to the location of the mobile station 110A (step 310). If the cache does not contain location information for the mobile station 110A, the Gateway PSN processor 170 accesses the home location register 160 to retrieve the location information (step 320), the processor 170 updates the cache (step 325), the Gateway PSN 150 routes the data packet to the mobile station 110A (step 330) and the Gateway PSN processor 170 deletes the data packet from the memory 163 (step 332).

If, on the other hand, it is determined in step 310 that the cache 165 contains the location information, the Gateway PSN processor 170 retrieves the location information from the cache 165 (step 340) and the Gateway PSN 150 routes the data packet to the mobile station 110A (step 350). A determination is made as to whether the Gateway PSN 150 received a routing error in response to the routing of the data packet (step 360). If no routing error is received, the data packet is deleted (step 332). Otherwise, if a routing error is received, the Gateway PSN processor 170 purges the cache entry associated with the mobile station 110A (step 370) and the Gateway PSN processor 170 accesses the Home Location Register 160 to retrieve the location of the mobile station 110A (step 380). The Gateway PSN processor 170 updates the cache 165 with the new location information for the mobile station 110A (step 390), the Gateway PSN routes the data packet to the mobile station 110A (step 400) and the Gateway PSN processor 170 deletes the data packet from the memory 163 (step 402).

While the present invention is particularly relevant to communication using packet data services on a mobile radio network, it is equally applicable to other types of communication including, but not limited to, voice communication on a mobile radio network. Furthermore, while the description and examples provided in the foregoing Figures and related drawings describe an implementation following one possible protocol and network architecture, it is understood that the present invention is applicable to other communication protocols and architectures.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. An apparatus for caching mobile station location information comprising:

a gateway packet switch node for receiving and transmitting communication packets between a plurality of visiting packet switch nodes within a mobile radio network and at least one communication network;

a cache memory located within the gateway packet switch node for caching location information received within the communication packet from a transmitting mobile station, said cache memory adapted to purge location information pertaining to a mobile station and further adapted to accept and store a new location information from a home location register, said new location information being associated with said mobile station; and a plurality of visiting PSN processors wherein, each visiting PSN processor is located within a visiting packet switch node of the plurality of visiting packet switch nodes for encapsulating a data packet and location information pertaining to the location of the transmitting mobile station to create the communication packet.

2. The apparatus as recited in claim 1, further comprising a gateway PSN processor located within the gateway packet switch node for processing mobile station location information received from mobile stations transmitting data packets.

3. The apparatus as recited in claim 2, wherein the gateway PSN processor de-encapsulates a communication packet to access the transmitting mobile station location information contained in the communication packet and caches the location information in the cache.

4. The apparatus as recited in claim 3, further comprising a home location register communicating with the gateway packet switch node for storing location information of mobile stations operating within the mobile radio network.

5. The apparatus as recited in claim 1, further comprising a plurality of visitor location registers wherein, each visitor location register communicates with a visiting packet switch node of the plurality of visiting switch nodes for storing location information of mobile stations served by base stations belonging to the visiting packet switch node.

6. A method for maintaining cached mobile station location information comprising the steps of:

receiving, from a visiting packet switch node, a communication packet, which includes a data packet encapsulated with a first location information pertaining to a first mobile station that created the data packet, addressed to a second mobile station;

determining if a second location information pertaining to the second mobile station is stored within a cache located within a gateway packet switch node;

if the second location information pertaining the second mobile station is stored within the cache, perform the steps of:

retrieving the second location information from the cache;

routing the data packet to the second mobile station comprising the steps of:

receiving a routing error message;

updating the cache, wherein said step of updating comprises the steps of:

purging the second location information pertaining to the second mobile station;

retrieving the second location information from a home location register; and caching the second location information, and rerouting the data packet to the second mobile station based on updated second location information pertaining to the second mobile station in the cache;

otherwise if the second location information is not stored within the cache, perform the step of:

retrieving the second location information pertaining to the second mobile station from a home location register; and routing the data packet to the second mobile station.

* * * * *

UNITED STATES PATENT AND TRADEMARK OFFICE
CERTIFICATE OF CORRECTION

PATENT NO. : 6,414,962 B1
DATED : July 2, 2002
INVENTOR(S) : Goran Hall et al.

It is certified that error appears in the above-identified patent and that said Letters Patent is hereby corrected as shown below:

<u>Title page,</u>
Item [75], replace "Hans-Göran Sundell" with -- Hans-Olof Sundell --

<u>Column 3,</u>
Line 62, replace "195A transmitted" with -- 195A is transmitted --

<u>Column 8,</u>
Line 4, replace "information, and" with -- information; and --

Signed and Sealed this

Fourteenth Day of January, 2003

JAMES E. ROGAN
*Director of the United States Patent and Trademark Office*